May 8, 1928. 1,669,102
J. D. RUYS
PROCESS FOR RECOVERY OF SULPHURIC ACID FROM ACID SLUDGES
Filed April 18, 1927
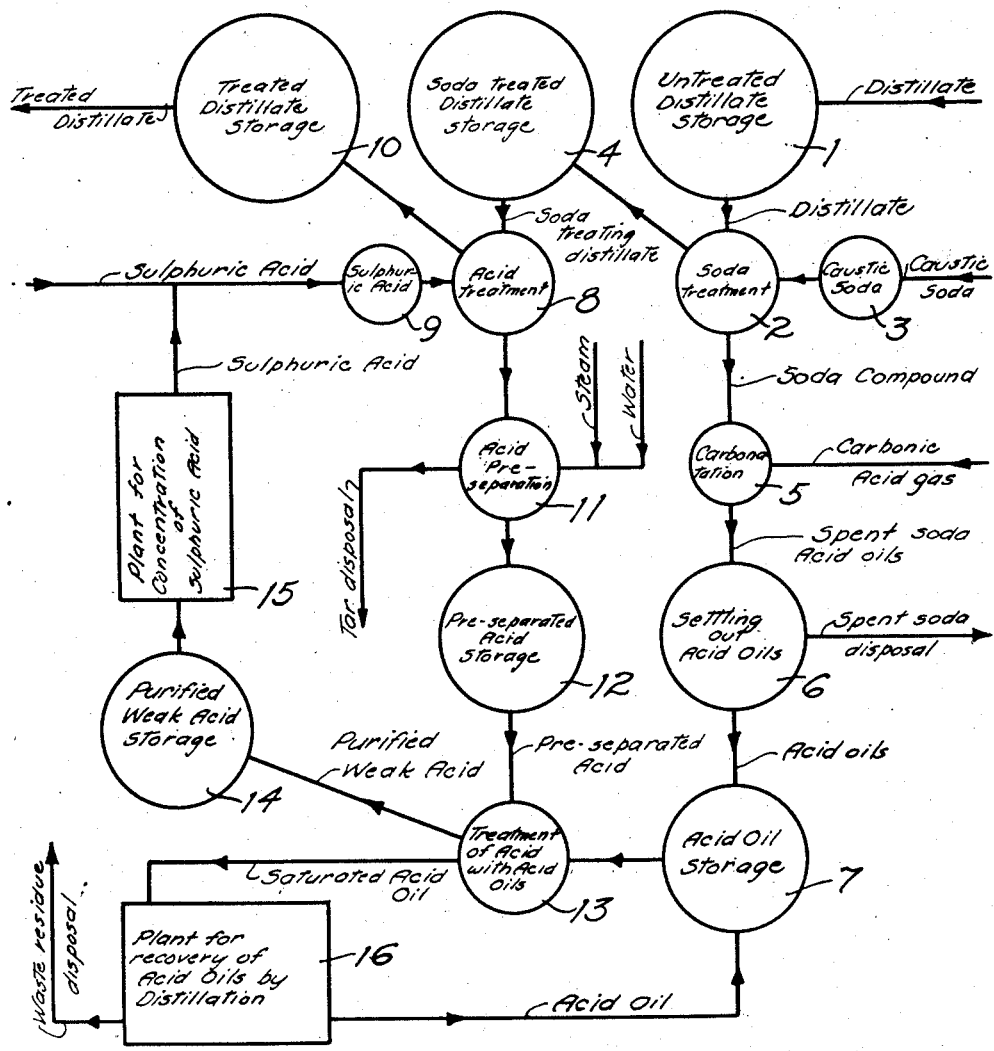
INVENTOR:
JAN D. RUYS
BY Ford ...
ATTORNEY.

Patented May 8, 1928.

1,669,102

UNITED STATES PATENT OFFICE.

JAN D. RUYS, OF WILMINGTON, CALIFORNIA, ASSIGNOR TO SHELL COMPANY OF CALIFORNIA, OF SAN FRANCISCO, CALIFORNIA, A CORPORATION OF CALIFORNIA.

PROCESS FOR RECOVERY OF SULPHURIC ACID FROM ACID SLUDGES.

Application filed April 18, 1927. Serial No. 184,482.

My invention relates to the art of petroleum oil refining and more particularly to the reclamation and recovery of sulphuric acid from acid sludges.

It is common practice in oil refineries to treat various types of petroleum distillates with sulphuric acid for the purpose of removing impurities therefrom. The acid combines with these impurities to form an acid sludge which settles out of the purified distillate and is drawn off.

The acid sludge obtained from the treatment of many petroleum distillates can be separated into a weak acid, which can be readily concentrated and reused, and into certain heavy tar-like substances which may be burned.

When however, petroleum is subjected to certain forms of treatment such for example a those processes commonly termed "cracking processes", an acid sludge is produced from which on separation a very impure weak acid is obtained which cannot be readily concentrated. Similar rebellious acid sludges are also produced in the acid treatment of many other petroleum products and my process is applicable to any such sludge. The impurities absorbed by the acid during the treatment of the oil cannot readily be completely separated from the acid and any attempt to concentrate the weak acid obtained from such sludge produces solids or jelly-like semi-solids which are not only of no value but which are difficult to dipose of. These impurities apparently contain resins or the like.

Such sludge is highly corrosive and obnoxious, cannot be run safely into streams or sewers, and its destruction by burning or chemical means is both difficult and expensive. Moreover, such destruction involves the loss of the acid content carried therein.

It is an object of my invention to provide a process by which rebellious acid sludges produced in the treatment of petroleum products with sulphuric acid may be refined and the acid contained therein put in such condition that it can be concentrated and recovered by various well known methods.

This refining of the acid sludge can be readily accomplished by the use of "acid oils" which may be conveniently obtained from cracked distillates or other cracked products. These acid oils are removed from the cracked products by agitating the products with a solution of caustic soda in water which produces certain water soluble compounds. These water soluble compounds contain the acid oils, probably in chemical combination with the soda, and the solution is readily separated from the cracked products by decantation. The acid oils can then be obtained from this solution by treating it with an acid which combines with the soda and sets free the acid oils. For this purpose even acids with a very weak acid character can be used as for instance, $H_2S$ or $CO_2$. In practice I prefer to use $CO_2$ which is readily available in combustion gases, but any other acid of stronger acid character than the acid oils is suitable.

It is extremely difficult to determine the exact nature of the acid oils liberated by the above method, but I have found that in the treatment of certain California petroleum products an acid oil is produced which contains a large proportion of a fraction having the boiling range of xylenols and I believe the acid oil to consist chiefly of a mixture of the various isomeric xylenols and some of the homologous compounds.

The acid oils liberated by the $CO_2$ readily separate from the water and are available for use in the treatment of the acid sludge.

In the treatment of acid sludge by my process the "acid oil" is added to the acid sludge or to weak acid derived therefrom and thoroughly agitated therewith. Since the chemistry of both the acid sludge and the acid oils is rather complicated, no general rule can be given as to the proportion of each that will be necessary for the best results, but this can be readily determined by any oil chemist skilled in the art by trial in the laboratory. Obviously the treatment of the weak acid with acid oil can be carried on as a single batch operation or by various forms of continuous or multiple batch methods, or by so-called "back-washing" or "counter-current" methods such as will occur to any chemist skilled in the art.

Apparently the acid oils have a high affinity for the organic compounds found in the separated acid sludges. The result is that the acid oils remove from the weak acid of the sludge those compounds which have previously rendered the concentration of that acid difficult if not impossible. The acid oils carrying these organic compounds can be readily separated from the weak acid which is then left in a sufficiently pure state to be readily concentrated by well known methods to produce an acid which may be reused.

My invention perhaps can be better understood from a reference to the annexed drawing which as an example shows in diagrammatic form a method of treating of distillates with soda and acid and recovering acid from the acid sludge formed.

Distillate such as pressure distillate produced by any of the well known cracking processes after being subjected, if necessary, to a treatment removing sulphuretted hydrogen, is delivered to a storage tank 1, passing therefrom to a soda treatment tank 2 in which it is mixed with caustic soda delivered from a suitable storage tank 3. In this treatment the soda combines with the acid oils present in the distillate and this compound is allowed to settle out from the distillate and is delivered to a carbonation tank 5, while the distillate is delivered to a storage tank 4. In the tank 5 the soda compound is treated with combustion gas of which the carbonic acid content is active in liberating the acid oils. The contents of tank 5 are then delivered to a settling tank 6, in which the soda and the acid oils are allowed to separate. The soda is then drained and disposed of and the acid oil is delivered to a storage tank 7. The soda treated distillate is delivered from the tank 4 to an acid treating tank 8 in which it is agitated with sulphuric acid from a sulphuric acid tank 9. The mixture is then allowed to stand and the treated distillate is withdrawn and delivered to a tank 10. During the settling operation in the tank 8 acid sludge is deposited in the bottom of the tank, being withdrawn therefrom and delivered to a pre-separating tank 11 in which it is treated with water and/or steam for the purpose of removing heavy tars and other impurities. Pre-separated acid is then delivered to the tank 12. This pre-separated acid is unfit for concentration and has to be refined according to my invention for which purpose it is delivered to the acid oil treatment tank 13 in which it is mixed with acid oil obtained from the acid oil storage tank 7. The acid oil takes up the remaining organic impurities in the weak acid. The purified weak acid is then allowed to settle out and is delivered to the weak acid storage tank 14. It is now fit for concentration which can be conveniently done by evaporation or other well known methods in the acid plant 15, the resulting sulphuric acid being then delivered to the storage tank 9. The acid oil containing the impurities is delivered from the tank 13 to the acid oil recovery plant 16, in which the acid oils are distilled off and condensed, leaving a waste residue which may be burned or otherwise disposed of. The acid oils recovered in the acid oil plant 16 are then delivered back to the storage tank 7 and are reused in the process.

I claim as my invention:

1. A process of refining acid sludge produced in petroleum oil refining which comprises treating said acid sludge with acid oils derived from cracked petroleum oils.

2. A process of refining acid sludge produced in petroleum oil refining which comprises treating said acid sludge with acid oils obtained from cracked petroleum oil fractions.

3. A process of producing a concentrated sulphuric acid from an acid sludge which comprises treating the acid sludge with an acid oil derived from cracked petroleum oils, separating the acid oil and impurities combined therewith from the weak acid of the sludge, and concentrating the weak acid.

4. A process of producing a concentrated sulphuric acid from an acid sludge which comprises treating the acid sludge with an acid oil produced from a cracked petroleum oil, separating the acid oil and impurities combined therewith from the weak acid of the sludge, and concentrating the weak acid.

5. A process of producing a concentrated sulphuric acid from acid sludge resulting from the treatment of cracked petroleum oil with sulphuric acid which comprises treatment of a cracked petroleum oil with a caustic soda solution to produce water soluble compounds containing an acid oil, separating said solution and said products, treating said solution with an acid to release the acid oil from the solution, agitating the acid sludge with the acid oil, separating the weak acid of the sludge from the acid oil, and concentrating the weak acid.

6. A process of producing a concentrated sulphuric acid from acid sludge resulting from the treatment of cracked petroleum oils with sulphuric acid which comprises treatment of a cracked petroleum oil with a soda solution to produce water soluble compounds containing an acid oil, separating said solution and said product, treating said solution with carbon dioxide to release the acid oil from the solution, agitating the acid sludge with the acid oil, separating the weak acid of the sludge from the acid oil, and concentrating the weak acid.

7. A process of removing deleterious substances from a weak solution of sulphuric acid obtained from acid sludge which comprises agitating said solution with an acid oil derived from cracked petroleum oil, and separating said acid oil and said solution.

8. A process of removing deleterious substances from a weak solution of sulphuric acid obtained from acid sludge which comprises agitating said solution with an acid oil composed largely of xylenol, and separating said acid oil and said solution.

In testimony whereof, I have hereunto set my hand at Wilmington, California, this eighth day of April, 1927.

JAN D. RUYS.